(12) United States Patent
Troemel, Jr. et al.

(10) Patent No.: US 9,973,222 B2
(45) Date of Patent: May 15, 2018

(54) HIGHLY CONFIGURABLE RADIO FREQUENCY (RF) MODULE

(71) Applicant: Panasonic Automotive Systems Company of America, Division of Panasonic Corporation of North America, Peachtree City, GA (US)

(72) Inventors: Hans A. Troemel, Jr., Sharpsburg, GA (US); Kishore S. Aligeti, Peachtree City, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 2 days.

(21) Appl. No.: 14/943,076

(22) Filed: Nov. 17, 2015

(65) Prior Publication Data

US 2016/0080014 A1    Mar. 17, 2016

Related U.S. Application Data

(63) Continuation of application No. 13/942,762, filed on Jul. 16, 2013, now Pat. No. 9,225,366, which is a continuation of application No. 11/653,022, filed on Jan. 13, 2007, now Pat. No. 8,515,494.

(51) Int. Cl.
H04M 1/00 (2006.01)
H04B 1/08 (2006.01)
H04B 1/00 (2006.01)

(52) U.S. Cl.
CPC ............ H04B 1/08 (2013.01); H04B 1/0003 (2013.01); *Y10T 29/49018* (2015.01)

(58) Field of Classification Search
CPC .... H04B 1/0003; H04B 1/08; Y10T 29/49018
See application file for complete search history.

(56) References Cited

U.S. PATENT DOCUMENTS 9,225,366 B2 * 12/2015 Troemel, Jr. ......... H04B 1/0003

* cited by examiner

*Primary Examiner* — Minh Trinh
(74) *Attorney, Agent, or Firm* — Laurence S. Roach, Esq.

(57) ABSTRACT

The disclosed embodiments relate to a communication device (200) that implements a subset of feature choices selected from a complete set of feature choices. An exemplary embodiment comprises at least one common hardware component (210) common to any subset of feature choices, and a base (102) that is adapted to accommodate installation of at least one optional hardware component (221) associated with at least one feature of the complete set of feature choices.

6 Claims, 4 Drawing Sheets

HIGHLY CONFIGURABLE RADIO FREQUENCY (RF) MODULE

CROSS-REFERENCE TO RELATED APPLICATION

This application is a continuation of U.S. patent application Ser. No. 13/942,762, filed on Jul. 16, 2013, now U.S. Pat. No. 9,225,366, issued on Dec. 29, 2015, which is a continuation of U.S. patent application Ser. No. 11/653,022, filed on Jan. 13, 2007, which is now U.S. Pat. No. 8,515,494, issued on Aug. 20, 2013, the disclosures of which are hereby incorporated by reference in their entireties for all purposes.

FIELD OF THE INVENTION

The present invention generally relates to the design and manufacture of communication devices such as radio frequency (RF) receiver modules. In particular, the present invention relates to a system and method that allows flexible feature selection for the design of RF receiver modules while simplifying the design and manufacturing process of the module.

BACKGROUND OF THE INVENTION

A designer of RF receiver modules, such as tuner modules that are adapted to receive satellite radio transmissions, must make a number of feature choices regarding features to be included in a given RF receiver module design. For instance, some RF receiver module designs may be intended for use in an audio system having a single antenna (single-arm antenna configuration), while other RF receiver module designs may be intended for use in systems with multiple antennas (diversity antenna configuration). This is only one example of a feature choice made in the design of a typical RF receiver module. Numerous feature choices are made by customers such as car manufacturers, who want a particular feature set for each given RF receiver module design.

Choices between available features (for example, the choice between a single-arm antenna configuration and a diversity antenna configuration) have an impact on the hardware and software requirements for the RF receiver module. Various hardware and software components may be either required or not required, depending on the feature set chosen for a given RF receiver module design. As the number of supported feature choices increases, the number of different hardware and software designs also increases. With this increase in number of designs, the complexity and expense attributable to maintaining and supporting separate designs also increases for the manufacturer of RF receiver modules.

SUMMARY OF THE INVENTION

The disclosed embodiments relate to a communication device that implements a subset of feature choices selected from a complete set of feature choices. An exemplary embodiment comprises at least one common hardware component common to any subset of feature choices, and a base that is adapted to accommodate installation of at least one optional hardware component associated with at least one feature of the complete set of feature choices.

BRIEF DESCRIPTION OF THE DRAWINGS

The above-mentioned and other features and advantages of the present invention, and the manner of attaining them, will become apparent and be better understood by reference to the following description of one embodiment of the invention in conjunction with the accompanying drawings, wherein.

Corresponding reference characters indicate corresponding parts throughout the several views. The exemplifications set out herein illustrate a preferred embodiment of the invention, in one form, and such exemplifications are not to be construed as limiting in any manner the scope of the invention.

DETAILED DESCRIPTION OF THE PREFERRED EMBODIMENTS

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Exemplary embodiments of the present invention allow improved flexibility in the design of communication devices. In particular, an RF receiver module in accordance with an exemplary embodiment of the present invention is adapted to support a wide range of subsets of feature choices from a complete set of feature choices while reducing system design complexity and cost. Feature choices are mapped to corresponding hardware and software system components in a modular fashion to allow manageable optimization of system design. Moreover, an exemplary embodiment of the present invention allows RF receiver modules to be designed to support any of a subset of feature choices from a complete set of feature choices with a relatively small number of common hardware and software components.

Figure 1:
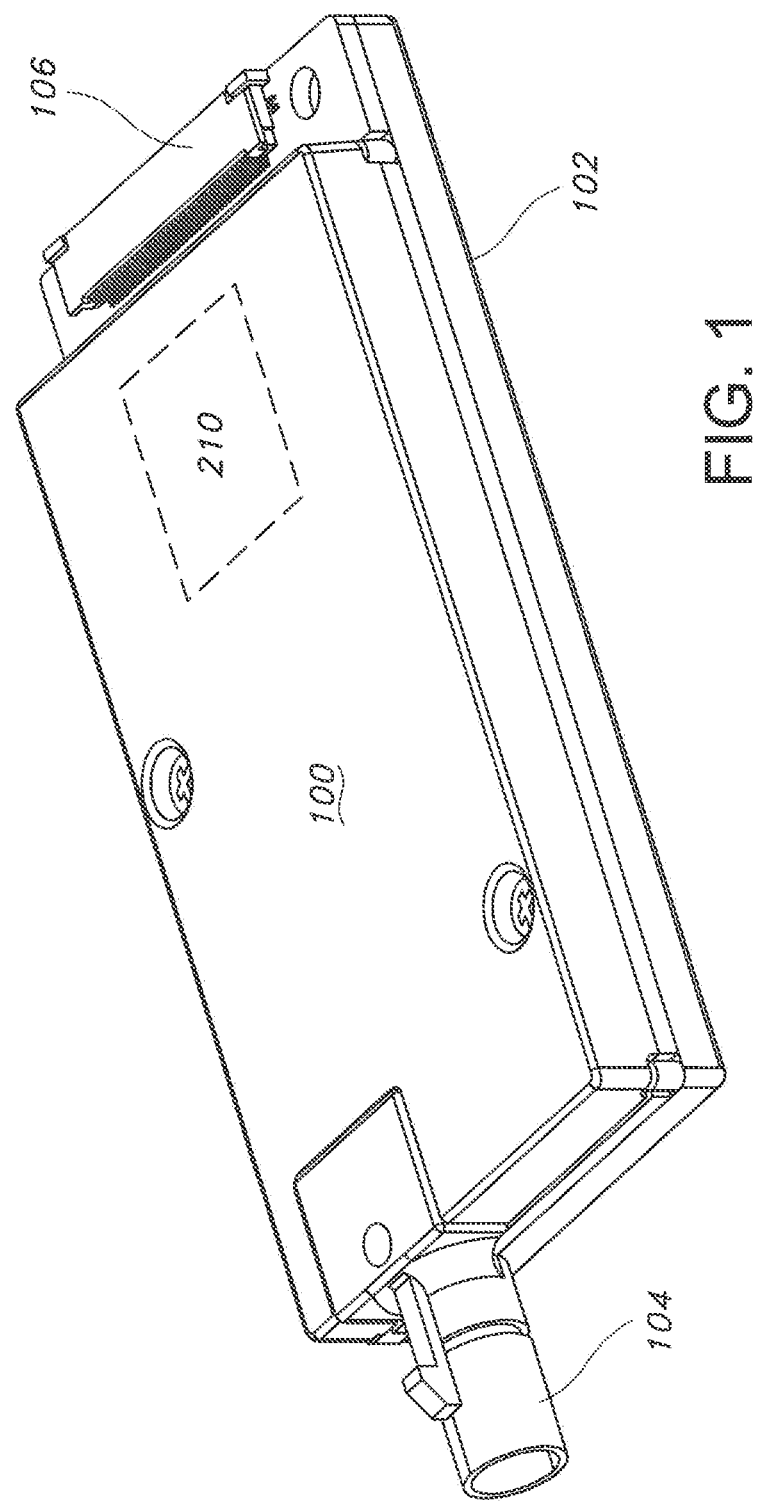
FIG. 1 is a perspective view of an RF receiver module in accordance with an exemplary embodiment of the present invention.

FIG. 1 is a perspective view of an RF receiver module in accordance with an exemplary embodiment of the present invention. The RF receiver module is generally referred to by the reference number 100. The RF receiver module 100 includes a base 102, which serves as a support for various electronic components that receive and decode an RF signal. As set forth in detail with respect to FIGS. 2A and 2B, the base 102 is adapted to accommodate at least one optional hardware component associated with at least one feature of a complete set of features. In addition, the base 102 is adapted to accommodate the omission of optional hardware components if features associated with the optional hardware components are not part of a subset of chosen features out of the complete set of features for a specific design.

Exemplary embodiments of the RF receiver module 100 comprise decoders for one or more of the following types of signals: XM satellite radio, Sirius satellite radio, AM/FM radio, Global Positioning System (GPS), WiMAX, Digital Audio Broadcasting (DAB) digital radio, cellular telephone or similar receivers and transceivers. An audio system in accordance with an exemplary embodiment of the present invention includes one or more RF receiver modules, each adapted to receive and decode one or more signal type.

The RF receiver module 100 includes an RF connector 104 and a ribbon cable connector 106. The RF connector 104 is adapted to receive an RF signal from a signal source such as an antenna (not shown). The ribbon cable connector 106 is adapted to connect the RF receiver module 100 to an audio system main printed circuit board (PCB) (not shown), which supports general audio processing circuitry. The audio system main PCB may include a processor that controls the overall operation of the audio system. Additionally, the audio system main PCB may be adapted to facilitate user selection of audio system parameters such as signal source, volume or the like.

The exemplary embodiment illustrated in FIG. 1 is adapted to receive either a signal from a single antenna (single-arm antenna configuration) or multiple signals (such as signals from multiple antennas (diversity antenna configuration)). Examples of additional feature choices for the RF receiver module 100 include whether the RF receiver module 100 employs an embedded stack of digital information (for example an XM stack), which typically necessitates the expense of an additional processor as a component in the RF receiver module 100. An RF receiver module configuration that includes an on-board processor to manipulate a stack is referred to herein as a "smart" configuration. "Stackless" configuration is an alternative to smart configuration of the RF receiver module 100. The term "stackless" herein refers to an RF receiver module configuration in which a stack, such as an XM stack, is maintained external to the RF receiver module 100. By way of example, a stackless RF receiver module configuration may exploit an external XM stack maintained by a processor on the audio system main PCB (not shown).

Yet another feature choice with respect to the RF receiver module 100 is whether the RF receiver module 100 is compatible with a single type of received information, such as only XM satellite radio transmissions. Alternatively, the 100 includes hardware and software components to decode both XM satellite radio signals and Sirius satellite radio signals.

Further examples of feature choices are the audio format of information processed by the RF receiver module 100 and the connector type used to interface the RF receiver module 100 to external components. Examples of different audio formats include Sony-Philips Digital Interface Format (SPDIF) and Inter IC Sound (I2S) audio format. Examples of connector types known to those of ordinary skill in the art include J100 connectors and J101 connectors.

Table 1 below is an exemplary feature choice matrix that is useful in explaining an exemplary embodiment of the present invention. Moreover, Table 1 shows an exemplary collection of subsets of RF receiver module feature choice configurations or groupings. Each subset of feature choices shown in Table 1 corresponds to a mapping of five feature choices to specific hardware and software components. The five design choices shown in Table 1 are: XM-only reception versus Interoperable reception (identified as "antenna type" in Table 1), SPDIF audio format versus I2S audio format (identified as "audio format" in Table 1), single-arm antenna configuration versus diversity antenna configuration (identified as "RF type" in Table 1), smart configuration versus stackless configuration (identified as "stack type" in Table 1) and ribbon cable connector type (J100 versus J101). In the example set forth in Table 1, these five feature choices comprise a total or complete set of feature choices. Those of ordinary skill in the art will appreciate that these feature choices are discussed herein as examples. The scope of features choices that may be employed in an exemplary embodiment of the present invention is not limited by the examples set forth herein. Additional feature choices that may be taken into an account in an exemplary embodiment of the present invention include, for example, a market type (for example, U.S. market, Canadian market, etc.), a memory size (for example, 128 Megabytes, 256 Megabytes, etc.) or an RF connector type (Fakra versus SMB (SubMiniature B), for example).

TABLE 1

RF Receiver Module Feature Choice Matrix

| | | SMART | | | STACKLESS | | | |
| --- | --- | --- | --- | --- | --- | --- | --- | --- |
| Antenna Type | Audio Format | SINGLE-ARM J100 ONLY | SINGLE-ARM J101 ONLY | DIVERSITY | SINGLE-ARM J100 ONLY | SINGLE ARM J101 ONLY | DIVERSITY | STACK TYPE RF TYPE |
| XM | SPDIF | Cookies'n Cream | Rainbow Sherbet | Sweet Cream | Coffee | Orange Sherbet | Cookie Dough | Code Name |
| | I2S | Vanilla | Strawberry | Chocolate | Peanut Butter | Rum Raisin | Peppermint | Code Name |
| INTEROPERABLE | SPDIF | Rocky Road | Pistachio Almond | Cherries Jubilee | Daiquiri Ice | Pink Bubblegum | Heath Bar | Code Name |
| | I2S | Mint Chocolate Chip | Pralines'n Cream | Butter Pecan | Caramel Fudge | Butterscotch Ripple | Neapolitan | Code Name |

RF receiver module 100 may be adapted to receive signals from multiple sources. By way of example, an antenna standard has been developed to support a single antenna capable of receiving both XM satellite radio and Sirius satellite radio. This standard is known as the Satellite Digital Audio Radio Services (SDARS) Interoperable Antenna Specification (sometimes referred to as the Interoperable Antenna Specification). If adapted for use in an audio system having an interoperable antenna, the RF receiver module In Table 1, each unique subset of configuration feature choices is designated using a corresponding code name. Ice cream flavors are used as code names in Table 1. By way of example, an RF receiver module configuration that has a stack type of stackless, an RF-type of diversity, an antenna type of Interoperable and an audio type of I2S is designated by the code name of Neapolitan. As another example, an RF receiver module configuration that has a stack type of smart, an RF-type of single-arm, an antenna type of XM, an audio type of I2S and a connector type of J101 is designated by the code name of Strawberry. As shown by the exemplary configuration matrix set forth in Table 1, all feature choice subsets do not necessarily take into account all feature choices. For example, there is no choice of connector type in RF receiver module configurations with an RF type of diversity in the exemplary configuration data shown in Table 1. The mapping of the subsets of feature choices shown in Table 1 to specific hardware and software configurations is discussed below with reference to FIGS. 2A and 2B.

Figure 2A:
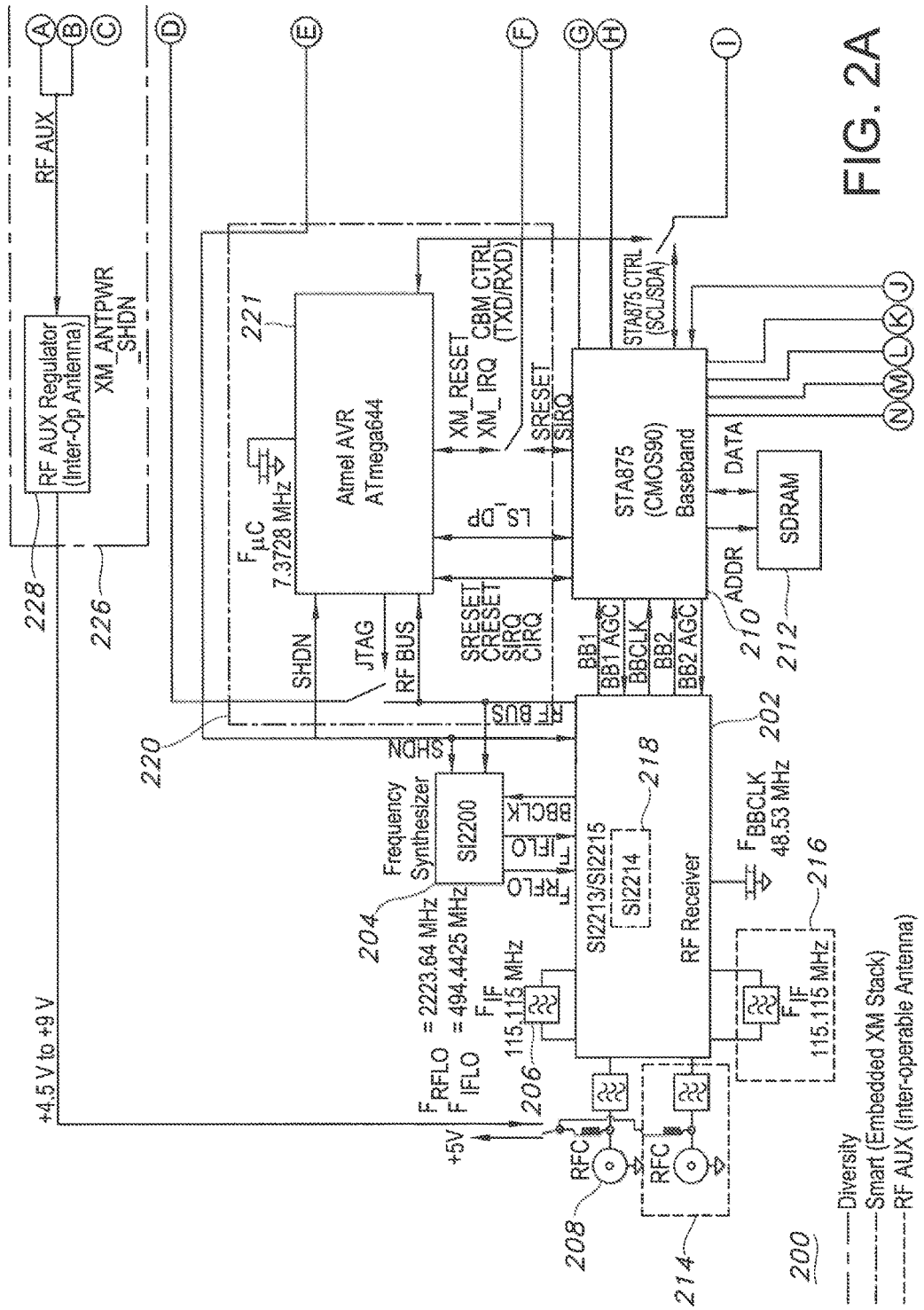
FIGS. 2A and 2B are a schematic block diagram of an RF receiver module in accordance with an exemplary embodiment of the present invention.
Figure 2B:
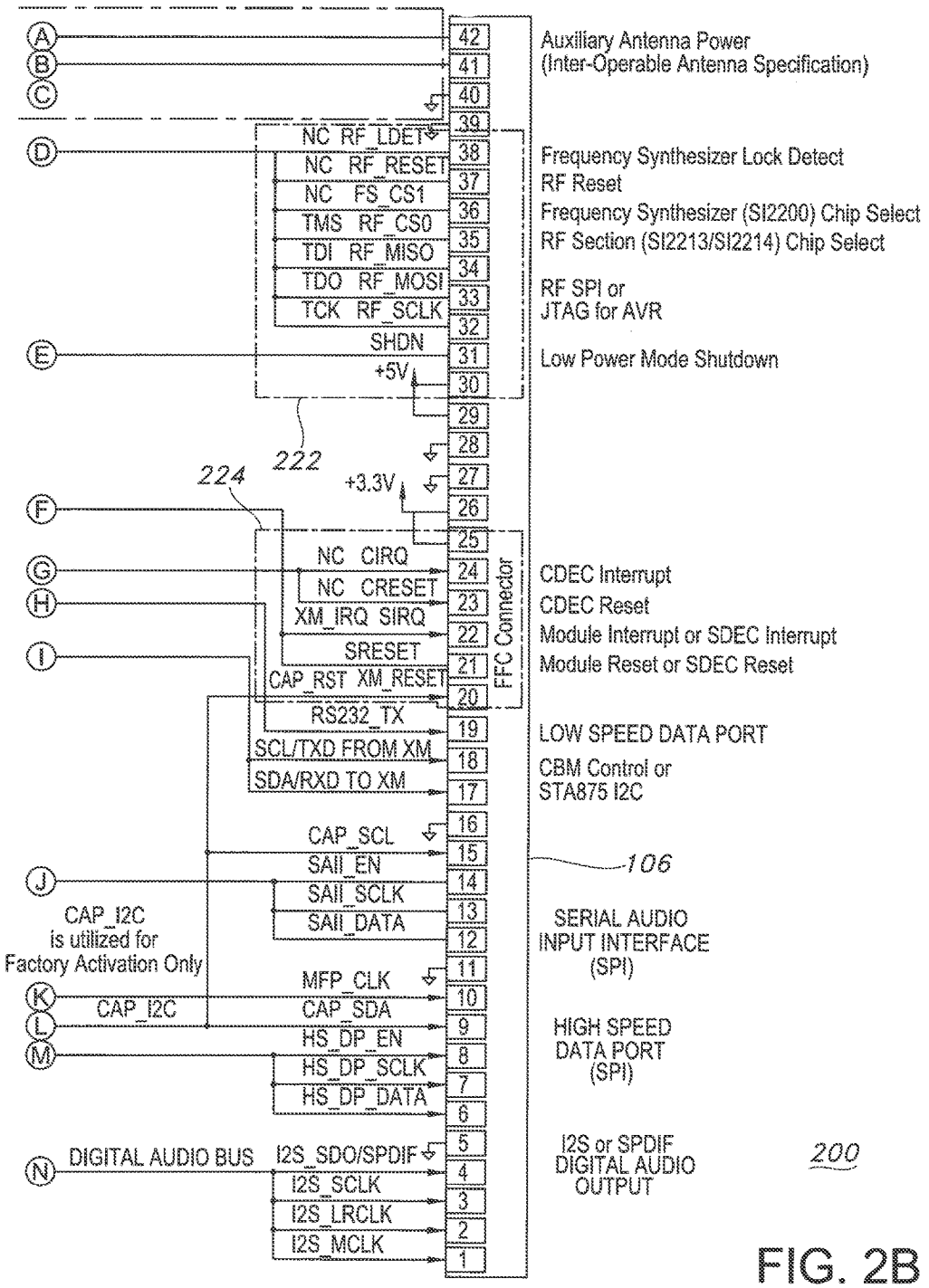

FIGS. 2A and 2B are a schematic block diagram of an RF receiver module in accordance with an exemplary embodiment of the present invention. The RF receiver module is generally referred to by the reference number 200. Various components shown in FIGS. 2A and 2B may be disposed on a base such as the base 102 (FIG. 1). The RF receiver module 200 includes the connector 106 (FIG. 1), which provides an interface to an audio system main PCB (not shown).

As set forth below, in the exemplary RF receiver module 200 design illustrated in FIGS. 2A and 2B, certain components are common to all subsets of feature choices. Additional optional components (either hardware or software) may be added if needed to support a design having a subset of feature choices that includes optional features. If certain optional features are not chosen for a given RF receiver module design, the hardware and software components needed to provide and/or support those optional features are omitted from the design. In this manner, a specific, known group of components may be used to create a wide variety of RF receiver module designs based on different subsets of feature choices from a complete set of feature choices.

An example of a hardware component to common to any subset of feature choices shown in Table 1 is the baseband processor 210. Another example of a common hardware component is a random access memory (RAM) 212, such as a synchronous dynamic random access memory (SDRAM) or the like. In an exemplary embodiment of the present invention, the RAM 212 contains one or more software components that support operation of the RF receiver module 200. The software components contained in the RAM 212 may be uniquely configured to support only the particular subset of feature choices of the RF receiver module 200. Moreover, different software components may be stored in the SD RAM 212 for different subsets of feature choices. Alternatively, a single, configurable software module capable of supporting any subset of feature choices may be stored in the RAM 212.

Other components illustrated in FIGS. 2A and 2B are optional depending on which subset of feature choices is selected from the complete set of feature choices illustrated in Table 1. For example, the exemplary design illustrated in FIGS. 2A and 2B may include either a single-arm RF receiver 202 or a diversity RF receiver 218, depending on whether the RF-type feature choice is selected to be single-arm configuration or diversity configuration. The single-arm RF receiver 202 is capable of supporting the reception of one channel of information. The diversity RF receiver 218 is capable of supporting reception of multiple channels of information. The single-arm RF receiver 202 is further identified by the part numbers SI2213/SI2215 in the exemplary embodiment illustrated in FIGS. 2A and 2B. The diversity RF receiver 218 is further identified by the part number SI2214 in the exemplary embodiment illustrated in FIGS. 2A and 2B. For purposes of simplicity, the remainder of this application assumes that the single-arm RF receiver 202 is installed in the RF receiver module 200 unless the diversity RF receiver 218 is specifically referenced.

The baseband processor 210 receives output from the single-arm RF receiver 202. The base band processor 210 processes the received signal and delivers it to the connector 106, where it is passed on to the audio system main PCB (not shown). The single-arm RF receiver 202 is connected to a frequency synthesizer 204. The purpose of the frequency synthesizer 204 is to provide the correct local oscillator (LO) frequencies for the mixers contained in the RF receiver 202. These LO frequencies down convert the RF frequencies to a lower frequency so that the baseband chip ADCs will digitize the downconverted RF signal before demodulation and decoding. Also connected to the RF receiver 202 is a reference crystal 206 and a RF connector 208. The reference crystal provides the clock for the entire receiver system. The RF connector is connected to an approved antenna module. This antenna module may contain a low noise amplifier (LNA) that will set the system noise figure.

If a diversity configuration RF-type is chosen, additional diversity antenna components (besides the diversity RF-receiver 218) are added to the RF receiver module 200. In the example illustrated in FIGS. 2A and 2B, those additional diversity configuration components include a diversity voltage source 214 and a diversity RF oscillator 216. As illustrated in FIGS. 2A and 2B, the additional diversity components are shown surrounded by plain dashed lines.

If the stack type feature choice for a particular RF receiver module design is smart (rather than stackless), a set of smart components is added to the RF receiver module 200. These smart components are illustrated as enclosed within boxes that comprise a dash followed by a period. In the exemplary embodiment illustrated in FIGS. 2A and 2B, the smart components comprise a smart processor 221, a first group of smart signal connections 222 and a second group of smart signal connections 224. The smart processor 221 is shown for purposes of illustration in FIGS. 2A and 2B to be an Atmel AVR ATmega644 processor available from Atmel, although other suitable processors may be used. The first group of smart signal connections 222 and the second group of smart signal connections 224 are made between the smart processor 221 and the connector 106 in the exemplary embodiment illustrated in FIGS. 2A and 2B.

If the antenna type feature choice is interoperable (rather than XM only), an additional set of Interoperable components and connections 226 is added to the RF receiver module 200. The Interoperable components and connections 226 are illustrated in FIGS. 2A and 2B as enclosed within a box that comprises a long dash followed by two short dashes. The Interoperable components and connections 226 comprise an RF AUX regulator 228 in the embodiment illustrated in FIGS. 2A and 2B. The RF AUX regulator 228 provides compatibility with the Interoperable Antenna Specification previously mentioned. Interoperable connections are made between the RF AUX regulator 228 and the connector 106.

Those of ordinary skill in the art will appreciate that the RF receiver design set forth herein allows implementation of a wide range of subsets of feature choices from a complete set of feature choices with the same basic design. Because the design is modular, higher volumes can be processed using a fixed set of hardware and software components, therefore lowering manufacturing costs and increasing quality.

Figure 3:
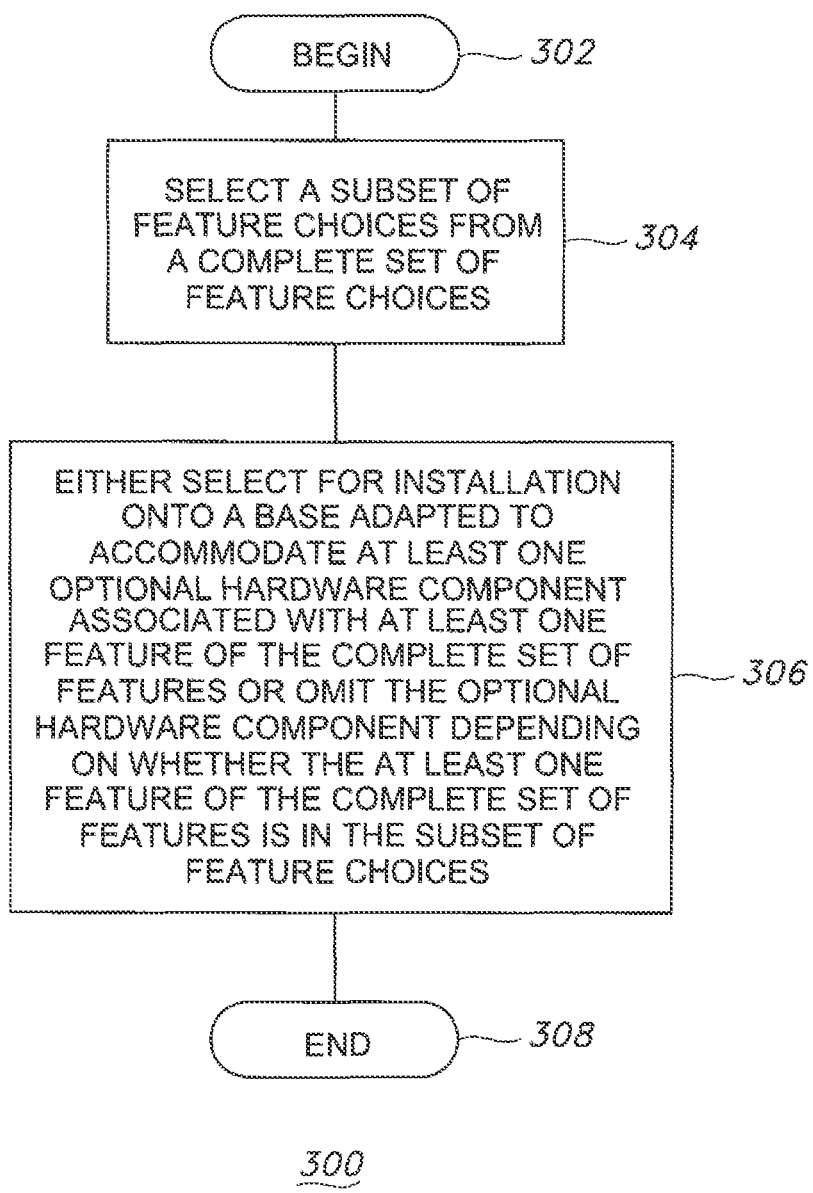
FIG. 3 is a flow diagram showing a process in accordance with an exemplary embodiment of the present invention.

FIG. 3 is a flow diagram showing a process in accordance with an exemplary embodiment of the present invention.

The flow diagram is generally referred to by the reference number 300. At block 302, the process begins.

At block 304, a subset of feature choices is selected from a complete set of feature choices. In an exemplary embodiment of the present invention, the complete set of feature choices are identified and valid subsets of feature choices are set forth in Table 1 above. Subsets of the complete set of feature choices correspond to individual code names set forth in Table 1. At block 306, optional components are either selected or omitted from the RF receiver module design depending on whether features supported by those hardware or software components are among the subset of features chosen from the complete set of features for a given design. At block 308, the process ends.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of manufacturing a radio frequency receiver module, said method comprising the steps of:
providing a base;
determining a first feature choice for the radio frequency receiver module, the first feature choice comprising one of:
an antenna;
a receiver; and
a stack of digital information;
selectively installing or omitting a first optional hardware component on the base dependent upon the determining step;
ascertaining a second feature choice for the radio frequency receiver module, the second feature choice comprising one of:
an audio format;
a ribbon cable connector;
a market in which the radio frequency receiver module will operate;
a memory size; and
a radio frequency connector; and
selectively installing or omitting a second optional hardware component on the base dependent upon the ascertaining step.

2. The method of claim 1 wherein the audio format comprises SPDIF audio format or I2S audio format.

3. The method of claim 1 wherein the ribbon cable connector comprises a J100 ribbon cable connector or a J101 ribbon cable connector.

4. The method of claim 1 wherein the market in which the radio frequency receiver module will operate comprises a geographic area to which the module is to be delivered.

5. The method of claim 1 wherein the memory size comprises a size of a memory device that is electrically connected to the baseband processor.

6. The method of claim 1 wherein the radio frequency connector comprises a connector that is adapted to receive an RF signal from an antenna.

* * * * *